July 17, 1934.  T. R. STONER  1,966,567
VALVE
Filed July 30, 1932
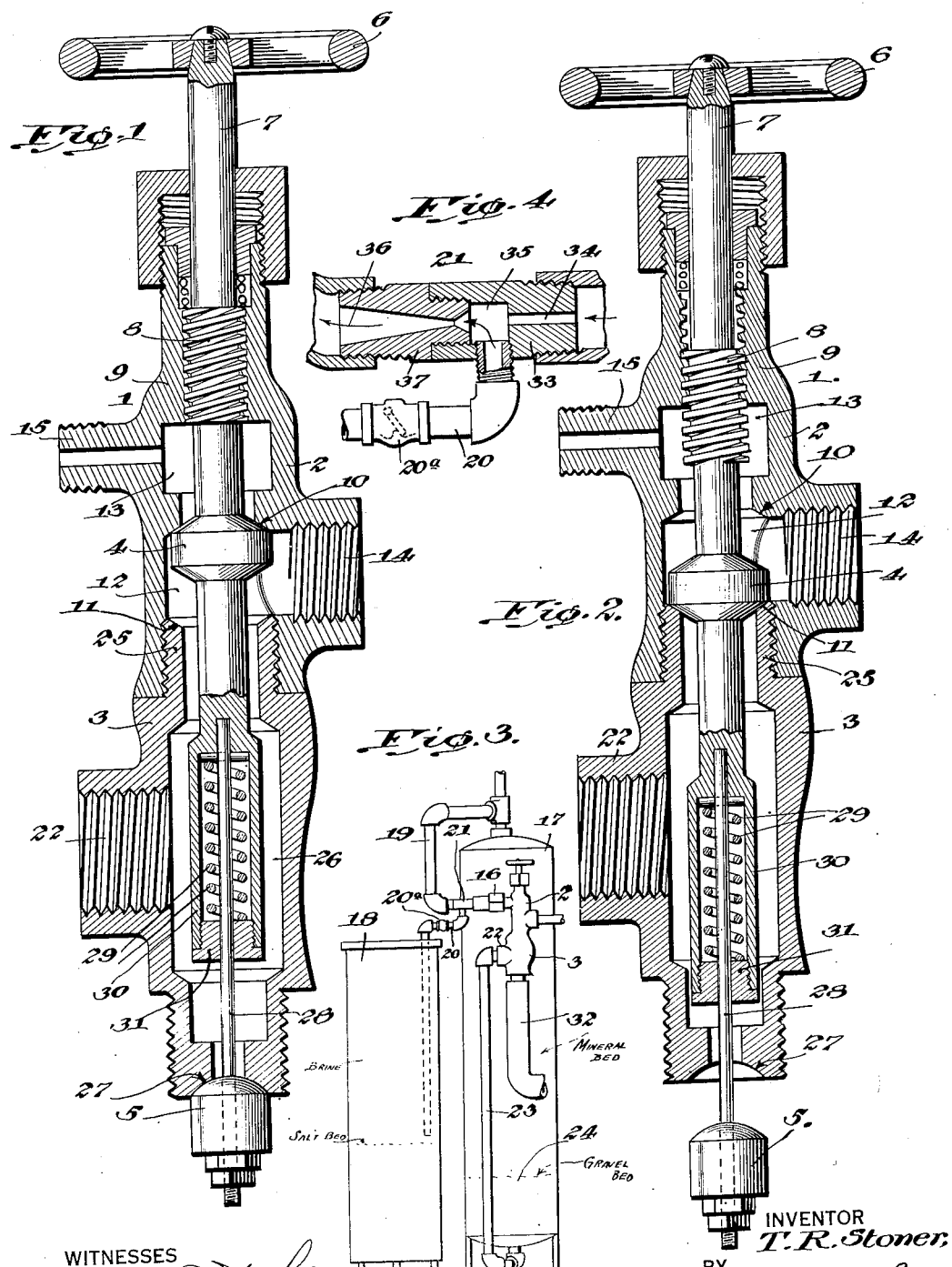
INVENTOR
*T. R. Stoner*

Patented July 17, 1934

1,966,567

UNITED STATES PATENT OFFICE 1,966,567

VALVE

Theodore R. Stoner, Oshkosh, Wis.

Application July 30, 1932, Serial No. 627,036

1 Claim. (Cl. 277—8)

This invention relates to improvements in valves, and its objects are as follows:

First, to provide a single-control or master valve for use in conjunction with water softening apparatus, water filters and the like, the single manual operations thereof in the two directions provided for producing all adjustments necessary to diverting the incoming water to the mineral tank or to the brine tank preparatory to regenerating the mineral substance in the mineral tank.

Second, to provide a valve having a main valve member which is adjustable into either of two positions with reference to the water inlet, said valve member carrying an auxiliary valve member which is independently movable to an open position when the main valve member is seated in one of its positions.

Other objects and advantages will appear in the following specification, reference being had to the accompanying drawing in which Figure 1 is a vertical section of the valve illustrating the main valve member in the position for operation in water softening, parts of said member being shown in elevation.

Figure 2 is a similar view showing the main valve member in the second position for operation in regenerating the mineral bed.

Figure 3 is a diagram illustrating the use of a valve in conjunction with mineral and brine tanks.

Figure 4 is a sectional view of an injector coupled in the piping between said tanks.

As previously stated, the improved valve is herein described for use in conjunction with water softening and filtering apparatuses, but it should be understood that these uses are merely illustrative and are not intended to limit the employment of the valve because the valve is adaptable to any use wherein one adjustment of the main valve member will confine the fluid flow to an entering stream in one direction, and the other adjustment of said valve member will permit the fluid to flow in a discharging stream in another direction.

These functions will be understood by referring to the drawing in which the valve, generally designated 1, is shown as comprising a divided body 2, 3 having a main valve member 4 working in the upper body, and an auxiliary valve member 5 working in conjunction with the lower body.

The main valve member is controlled by a handle 6. This handle is affixed to the exposed end of the valve stem 7 which is to be regarded as common to both the main and auxiliary valves 4, 5.

A screw 8 on the stem 7 works in the threaded hub 9 of the upper body 2, and it is by means of this screw that the main valve member 4 is driven into engagement either with the upper seat 10 or the lower seat 11, depending on the direction in which the handle 6 is turned.

The seat 10 occurs in the upper body 2 at a place between the inlet and flushing chambers 12, 13. The chamber 12 has an inlet opening 14 to which a pipe leading to the water supply is connected. The water supply may be regarded as the city main from which the particular residence in which the valve 1 is installed is to be furnished with water.

A nipple 15 provides a connection for a coupling 16 which joins the upper end of the valve with mineral and brine tanks 17, 18, through the medium of pipes 19, 20, (Fig. 3). Either the pipe 19 or 20 may have a back check valve 20ª connected therein to prevent a back flow of water from the service pipes in the normal operation of the system. The back check valve is shown in the pipe 20. The pipe 19 includes an injector 21 (Fig. 4), the purpose of which is to draw brine from the tank 18 and discharge it through the piping 19 by way of induction pipe 20, into the top of the tank 17 when the valve is in the position shown in Figure 2.

Ordinarily the passage of city water to the brine tank 18 is cut off when the valve 1 is adjusted for water softening purposes as in Fig. 1. This position is to be regarded as the normal position of the valve, because it is while the valve is in the position in Figure 1, that the city water is conducted to the house service pipes by way of an outlet opening 22 and a connected pipe 23 (Fig. 3), which leads to the bottom of the tank 17.

The mineral tank 17 contains a layer of gravel 24 and any one of variety of minerals manufactured for water softening purposes, such as those marketed under the trade marks "White Rox", "Decalso" or "Refinite." The water thus passes upwardly through the gravel and mineral beds and into the service pipes of the residence.

The seat 11 occurs on the lower body 3, the seat being part of a nipple 25 which is screwed into the upper body 2 until a firm connection is made. The lower seat 11 has communication with an outlet chamber 26 from which the foregoing outlet opening 22 extends. With the main valve member 4 in the position in Figure 1, the fluid flow will be confined to a single stream from the inlet opening 14 to the outlet opening 22, whence it continues to the bottom of the mineral tank 17 as already brought out.

An auxiliary seat 27 usually at the lower extremity of the body 3, is normally closed by the auxiliary valve member 5 previously mentioned. This valve member is carried by a thin stem 28 by which it is suspended from the valve stem 7 through the medium of a spring 29. This spring occupies a barrel formation 30 at the lower end of the stem 7. The principal purpose of the spring 29 is that of adjustment to take up any wear that might occur in the valve member above it. A plug 31 closes the barrel, provides an abutment for one end of the spring and serves as a guide for the stem 28.

As long as the city water has access to the relatively large outlet opening 22 the auxiliary valve member 5 which controls a much smaller opening, will remain undisturbed. But when the main valve member 4 is adjusted to its second position (Fig. 2) wherein the city water is diverted to the nipple 15 at which time brine will be drawn from the tank 18, the auxiliary valve member 5 will be subjected to city pressure by virtue of the discharging stream imposed thereon by way of the outlet opening 22, consequently, the auxiliary valve 5 will open and the water will be discharged into a pipe 32 (Fig. 3) which leads to a point of disposal. Briefly reverting to the injector 21, it will be seen in Fig. 4 that this is a two part structure. The part 33 has a fine hole 34 by which the stream of water is shot across a chamber 35 into the Venturi opening 36 of the other part 37. The pipe 20 is connected with the chamber 35 and the partial vacuum formed in the chamber draws up the brine from the tank 18.

The operation is readily understood. When the valve is adjusted in the position in Figure 2 last explained, water introduced at the inlet 14 enters the top of the mineral tank 17 by way of the piping 19. A supply of brine is drawn from the tank 18 by means of the injector 21, commingled with the water in the piping 19 and carried through the mineral bed for the regeneration of the latter. The water works on down through the mineral returning by way of the pipe 23 and outlet 22 thereupon discharging into the pipe 32.

The position of the valve in Fig. 1 is that in which it acts as a water softener. The water supply enters the valve at the inlet 14, discharges at the outlet opening 22 and flows to the bottom of the tank 17 by way of the pipe 23, in which tank it works up through the gravel and mineral bed and so to the service pipes.

I claim:

A valve comprising a body having chambers in tandem, passages connecting the chambers, an intermediate chamber having double valve seats, all of the chambers having at least one fluid port and one of the chambers having an additional fluid port with an auxiliary valve seat on the exterior of the valve body, a valve stem common to all of the chambers, said stem having a main valve member in the intermediate chamber, a stem extending out of the additional fluid port and means by which said stem is movably carried by the common stem, and an auxiliary valve carried by the second stem being situated outside of the valve body to engage the auxiliary seat.

THEODORE R. STONER.